United States Patent
Rasmussen et al.

(10) Patent No.: US 10,752,231 B2
(45) Date of Patent: Aug. 25, 2020

(54) SYSTEM AND METHOD FOR DETECTING STUCK VALVES

(71) Applicant: Harley-Davidson Motor Company Group, LLC, Milwaukee, WI (US)

(72) Inventors: Matthew David Rasmussen, Muskego, WI (US); Joseph Christopher Sharp, Lake Havasu, AZ (US); Bryan Todd Fulmer, Pewaukee, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 105 days.

(21) Appl. No.: 15/915,878

(22) Filed: Mar. 8, 2018

(65) Prior Publication Data

US 2018/0257629 A1 Sep. 13, 2018

Related U.S. Application Data

(60) Provisional application No. 62/468,886, filed on Mar. 8, 2017.

(51) Int. Cl.
*B60T 17/22* (2006.01)
*B60T 7/08* (2006.01)
(Continued)

(52) U.S. Cl.
CPC ............ *B60T 17/221* (2013.01); *B60T 7/042* (2013.01); *B60T 7/085* (2013.01); *B60T 8/1706* (2013.01); *B60T 8/885* (2013.01); *B60T 13/146* (2013.01); *B60T 13/662* (2013.01); *B60T 8/3225* (2013.01); *B60T 11/20* (2013.01);
(Continued)

(58) Field of Classification Search
CPC . B60T 7/085; B60T 7/042; B60T 8/00; B60T 8/17; B60T 8/885; B60T 8/90; B60T 8/1706; B60T 8/3225; B60T 11/20; B60T 13/142; B60T 13/146; B60T 13/662; B60T 17/22–227; B60T 2220/04; B60T 2250/00; B60T 2250/04; B60T 2270/413; B60T 2270/406; B60T 2270/408; B60T 17/221; B60T 17/18–228; B60T 2270/88;
(Continued)

(56) References Cited

U.S. PATENT DOCUMENTS

| 6,206,489 B1 * | 3/2001 | Schmidt | B60T 8/4086 303/11 |
| 6,289,271 B1 * | 9/2001 | Isono | B60T 7/042 303/122.12 |

(Continued)

FOREIGN PATENT DOCUMENTS

| DE | 102007016512 A1 | 11/2007 |
| DE | 102008003462 A1 | 5/2009 |

(Continued)

*Primary Examiner* — Jeffrey C Boomer
*Assistant Examiner* — Paul Allen
(74) *Attorney, Agent, or Firm* — Michael Best & Friedrich LLP

(57) ABSTRACT

A method of conducting a diagnostic procedure for a braking system includes analyzing via an electronic control unit whether only a first input device is engaged or only a second input device is engaged, conducting a first diagnostic test if only the first input device is engaged, and conducting a second diagnostic test if only the second input device is engaged.

16 Claims, 8 Drawing Sheets

(51) Int. Cl.

| | |
|---|---|
| *B60T 7/04* | (2006.01) |
| *B60T 8/17* | (2006.01) |
| *B60T 13/14* | (2006.01) |
| *B60T 13/66* | (2006.01) |
| *B60T 8/32* | (2006.01) |
| *G01L 19/08* | (2006.01) |
| *B60T 11/20* | (2006.01) |
| *B62L 3/08* | (2006.01) |
| *B60T 8/88* | (2006.01) |

(52) U.S. Cl.
CPC ....... *B60T 2250/00* (2013.01); *B60T 2250/04* (2013.01); *B60T 2270/406* (2013.01); *B60T 2270/413* (2013.01); *B60T 2270/88* (2013.01); *B62L 3/08* (2013.01); *G01L 19/083* (2013.01)

(58) Field of Classification Search
CPC ....... G01L 19/08; G01L 19/083; F16D 66/00; F16D 2066/005; B62L 1/00–5/20; B62L 3/08
USPC ...................... 701/33.9, 34.2, 34.4
See application file for complete search history.

(56) References Cited

U.S. PATENT DOCUMENTS

| | | | |
|---|---|---|---|
| 6,382,737 B1 * | 5/2002 | Isono | B60T 13/163 188/358 |
| 6,425,644 B2 | 7/2002 | Kawahata et al. | |
| 6,527,348 B2 | 3/2003 | Jensen | |
| 7,338,136 B2 | 3/2008 | Nakayama et al. | |
| 7,484,815 B2 | 2/2009 | Ogawa et al. | |
| 8,007,056 B2 | 8/2011 | Ohkubo et al. | |
| 8,046,149 B2 | 10/2011 | Nanri et al. | |
| 8,297,715 B2 | 10/2012 | Nishikawa et al. | |
| 8,364,371 B2 | 1/2013 | Calnek | |
| 2001/0038243 A1 * | 11/2001 | Isono | B60K 6/365 303/116.1 |
| 2002/0084691 A1 * | 7/2002 | Isono | B60T 8/4081 303/10 |
| 2004/0090114 A1 * | 5/2004 | Macnamara | B60T 8/1708 303/118.1 |
| 2004/0183369 A1 * | 9/2004 | Soga | B60T 8/268 303/113.4 |
| 2006/0250022 A1 * | 11/2006 | Hasegawa | B60T 8/1766 303/139 |
| 2007/0252429 A1 * | 11/2007 | Lerchenberger | B60T 8/261 303/113.2 |
| 2009/0216416 A1 * | 8/2009 | Nanri | B60T 8/1706 701/70 |
| 2011/0043031 A1 * | 2/2011 | Nishikawa | B60T 8/1706 303/137 |
| 2015/0084402 A1 | 3/2015 | Tober et al. | |
| 2015/0120161 A1 * | 4/2015 | Kamiya | B60T 7/042 701/70 |
| 2015/0314765 A1 * | 11/2015 | Maruo | B60T 8/4081 303/10 |
| 2016/0311422 A1 | 10/2016 | van Zanten et al. | |
| 2018/0162338 A1 * | 6/2018 | Irwan | B60T 17/221 |
| 2018/0162339 A1 * | 6/2018 | Irwan | B60T 8/885 |
| 2018/0162340 A1 * | 6/2018 | Irwan | B60T 13/66 |

FOREIGN PATENT DOCUMENTS

| | | |
|---|---|---|
| EP | 1671863 B1 | 6/2014 |
| JP | 5200753 B2 | 6/2013 |

\* cited by examiner

SYSTEM AND METHOD FOR DETECTING STUCK VALVES

CROSS-REFERENCE TO RELATED APPLICATIONS

The application is a non-provisional application of the U.S. Provisional Application No. 62/468,886 filed on Mar. 8, 2017. The entire contents of which are hereby incorporated by reference.

BACKGROUND

The present invention relates to braking systems for vehicles. In particular, the invention relates to braking systems for vehicles with two or more distinct brake inputs, such as motorcycles.

SUMMARY

The invention provides a method of conducting a diagnostic procedure for a braking system. An electronic control unit analyzes whether only a first input device is engaged or only a second input device is engaged. A first diagnostic test is conducted if only the first input device is engaged. A second diagnostic test is conducted if only the second input device is engaged.

A braking system includes a first brake circuit including a first master cylinder, a second brake circuit including a second master cylinder, a first input device operable to actuate at the first master cylinder; a second input device operable to actuate the second master cylinder, and an electronic control unit operable in a first mode when only the first input device is actuated and a second mode when only the second input device is actuated. The first mode includes a first diagnostic test of the first brake circuit and a second diagnostic test of the second brake circuit. The second mode includes a second diagnostic test of the first brake circuit and a first diagnostic test of the second brake circuit. The first diagnostic test of the first brake circuit is similar to the first diagnostic test of the second brake circuit. The second diagnostic test of the first brake circuit is similar to the second diagnostic test of the second brake circuit.

A braking system includes two master cylinders and two input devices, each of the two input devices in communication with a separate brake circuit. A method of conducting a diagnostic procedure for a braking system includes analyzing via an electronic control unit whether one, both, or none of the two input devices is actuated. If one of the two input devices is actuated, a first diagnostic test is conducted on the actuated brake circuit in communication with the one of the two braking actuators and a second diagnostic test is conducted on the unactuated brake circuit in communication with the other of the two input devices. If both of the two input devices are actuated, the first diagnostic test is conducted on the both of the two actuated brake circuits. If none of the two input devices are actuated, the second diagnostic test is conducted on both of the two unactuated brake circuits.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 2:
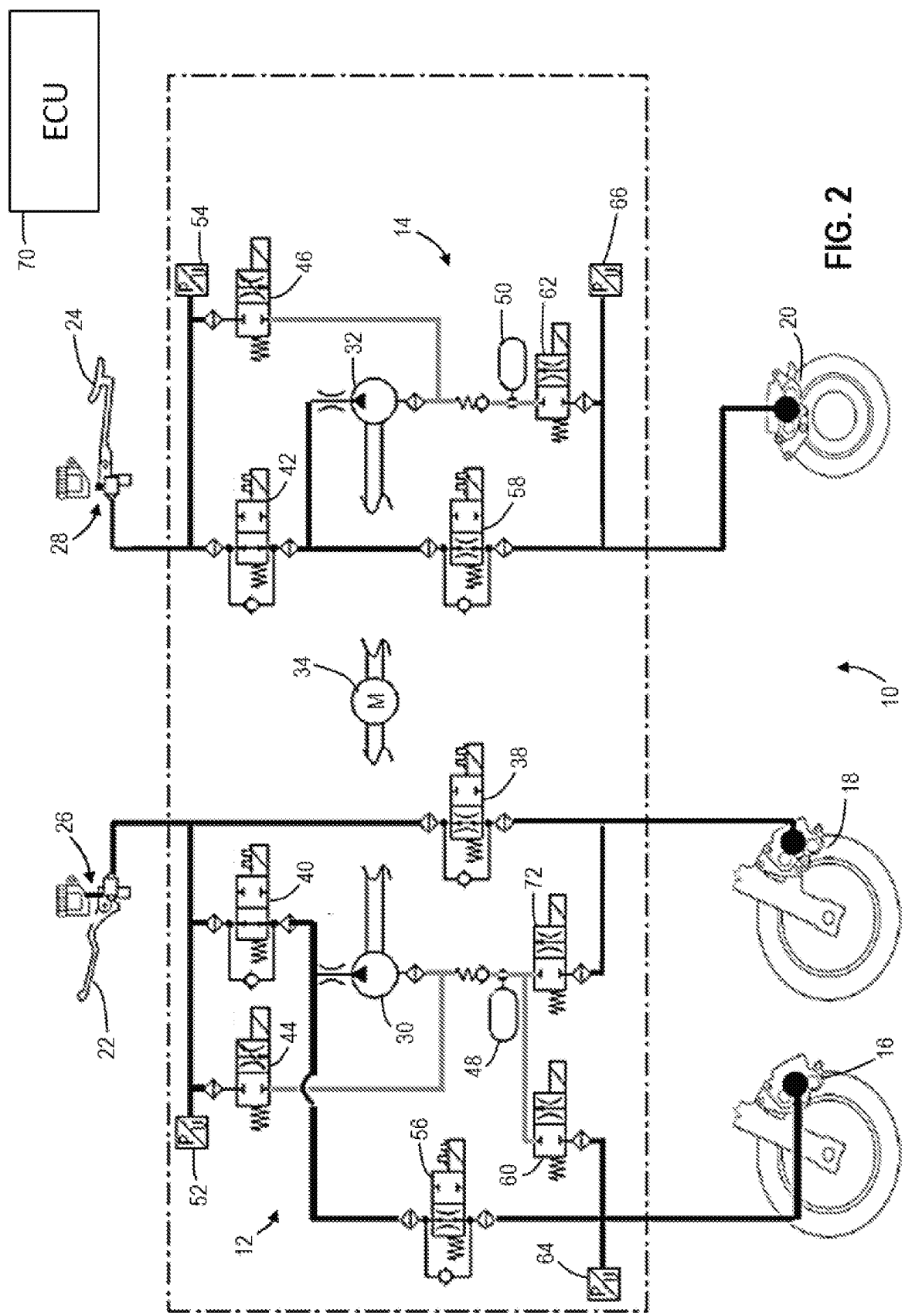
FIG. 2 is a schematic view of a brake system.

A braking system 10 is provided on a vehicle such as a motorcycle to operably provide braking to the vehicle upon user input. As shown in FIG. 2, the braking system includes two distinct hydraulic circuits, a first circuit 12 associated with a front wheel and first and second front wheel cylinders or calipers 16, 18, and a second circuit 14 associated with a rear wheel and a rear wheel cylinder or caliper 20. The circuits 12, 14 are further provided with respective distinct input devices (e.g., lever, pedal, etc.) 22, 24 and master cylinders 26, 28. Each master cylinder 26, 28 transforms an input force from the respective input device 22, 24 to a braking pressure within the respective circuit 12, 14. Each circuit 12, 14 is further provided with a hydraulic pump 30, 32. Both of the hydraulic pumps 30, 32 are powered by a motor 34. Alternative electro-hydraulic control units may otherwise be used to generate pressure at the wheel cylinders 16, 18, 20.

Though the first circuit 12 includes first and second front wheel cylinders 16, 18, the second front wheel cylinder 18 is a secondary wheel cylinder and responds to an input differently than the other wheel cylinders 16, 20. The second front wheel cylinder 18 communicates directly with the master cylinder 26 via the normally-open inlet valve 38 (i.e., apply valve) and does not receive hydraulic fluid from the pump 30. In contrast to the second front wheel cylinder 18, the first front wheel cylinder 16 and the single rear wheel cylinder 20 are schematically similar and will be described in greater detail below.

With respect to the first front wheel cylinder 16, a normally-open switching valve (build pressure control valve) 40 is located between the master cylinder 26 and the wheel cylinder 16. A normally-closed on/off valve (pressure build control valve) 44 is located between the master cylinder 26 and an inlet of the hydraulic pump 30. When a braking force is applied to the input device 22, and when it is desired that wheel pressure be increased above master cylinder pressure, the switching valve 40 is controlled to regulate the generated pressure. When the switching valve 40 is controlled, the on/off valve 44 transitions to the open position so that the fluid pressure produced by the input device 22 and the master cylinder 26 moves fluid into and through the pump 30. Additional fluid may come from a reservoir, thereby enacting an additional braking force. Fluid from the pump 30 applies pressure through the normally-open inlet valve 56 (i.e., apply valve) and at the wheel cylinder 16, thereby enacting a braking force. The first circuit 12 further includes two normally-closed outlet valves 60, 72 (i.e., release valve) that are operable to release pressure in ABS braking.

A master cylinder pressure sensor 52 measures the fluid pressure from the master cylinder 26 and sends a signal to a controller or electronic control unit 70. The controller provides a signal to the motor 34, to activate the motor 34 at a rate based on braking characteristics such as desired pressure build rate. The pressure is controlled, as described above, by the pressure build control valve 44 to selectively bleed off excess pressure generated by the pump 30. A wheel cylinder pressure sensor 64 additionally measures the pressure at the wheel cylinder 16.

With respect to the single rear wheel cylinder 20, a normally-open switching valve (build pressure control valve) 42 is located between the master cylinder 28 and the wheel cylinder 20. A normally-closed on/off valve (pressure build valve) 46 is located between the master cylinder 28 and an inlet of the hydraulic pump 32. When a braking force is applied to the input device 24, the switching valve 42 transitions to the closed position so that the fluid pressure produced by the braking force is not transmitted directly to the wheel cylinder 20. When the switching valve 42 closes, the on/off valve 46 transitions to the open position so that the fluid pressure produced by the input device 24 and the master cylinder 28 moves fluid into and through the pump 32. Additional fluid may come from a reservoir or, as shown, an accumulator 50. Fluid from the pump 32 applies pressure through the inlet valve 58 (i.e., apply valve) and at the wheel cylinder 20, thereby enacting a braking force. If necessary, a normally-closed outlet valve 62 (i.e., release valve) is operable to bleed off a portion of the fluid pressure back to the accumulator 50 and/or pump 32.

A master cylinder pressure sensor 54 measures the fluid pressure from the master cylinder 28 and sends a signal to a controller (not shown). The controller provides a signal to the motor 34, to activate the motor 34 at a speed proportional to the measured pressure. A wheel cylinder pressure sensor 66 additionally measures the pressure at the wheel cylinder 20.

At times, one or more of the valves 40, 42, 44, 46, 56, 58, 62 may become stuck (i.e., a valve is incapable of moving from one position to another). A stuck valve may limit the capabilities of the braking system 10 and it is therefore beneficial to determine whether the valve is stuck upon start-up of the vehicle. FIGS. 1A-G illustrate a method of diagnosing the functionality of the brake system, and specifically illustrate a method of diagnosing the functionality of various ones of the valves 40, 42, 44, 46, 56, 58, 62 of the braking system 10 utilizing only the pressure measurements from the pressure sensors 52, 54, 64, 66.

Figure 1A:
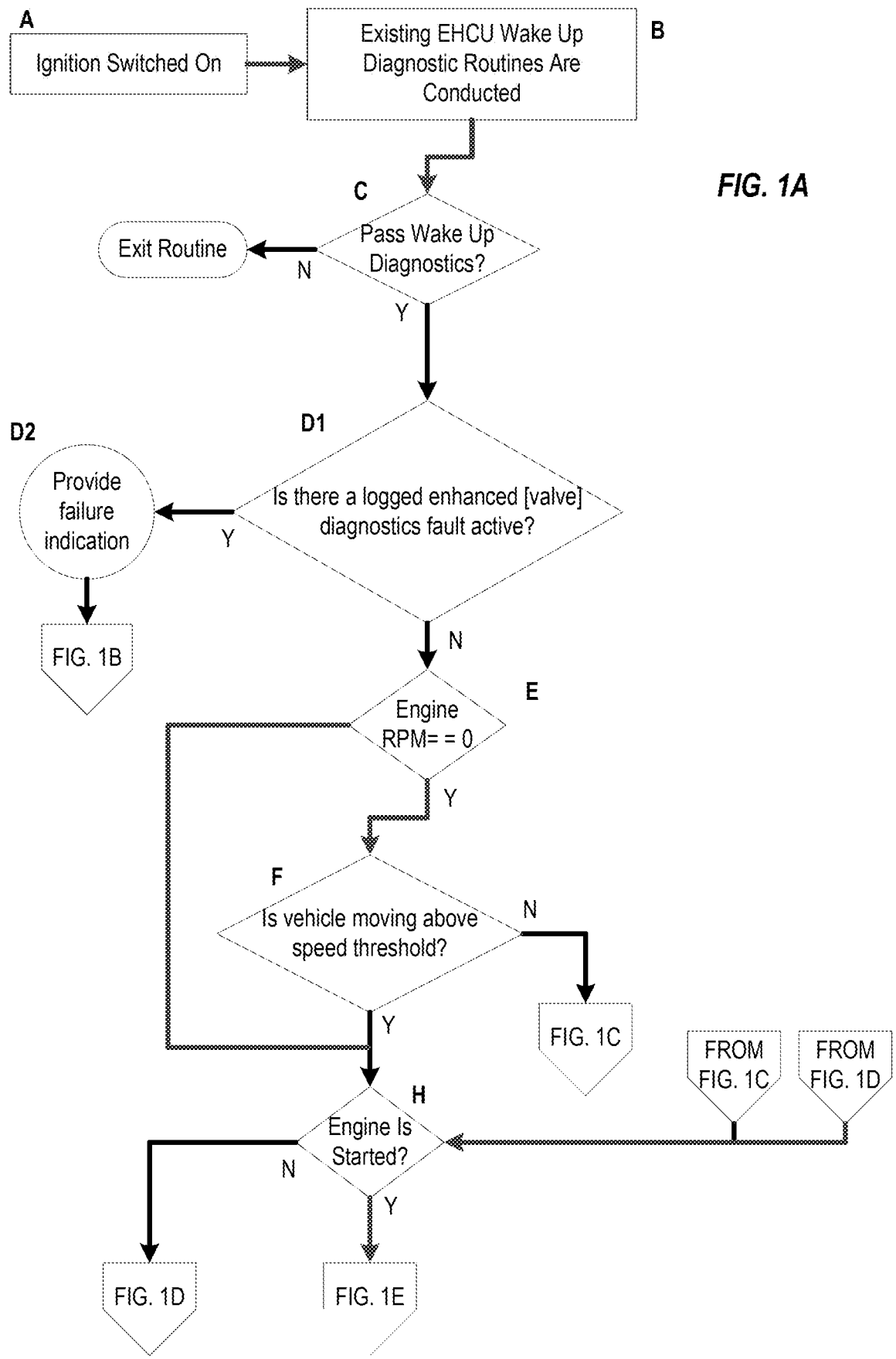
FIG. 1A is a first portion of a flowchart illustrating a method of diagnosing the functionality of a valve in the brake system.
Figure 1B:
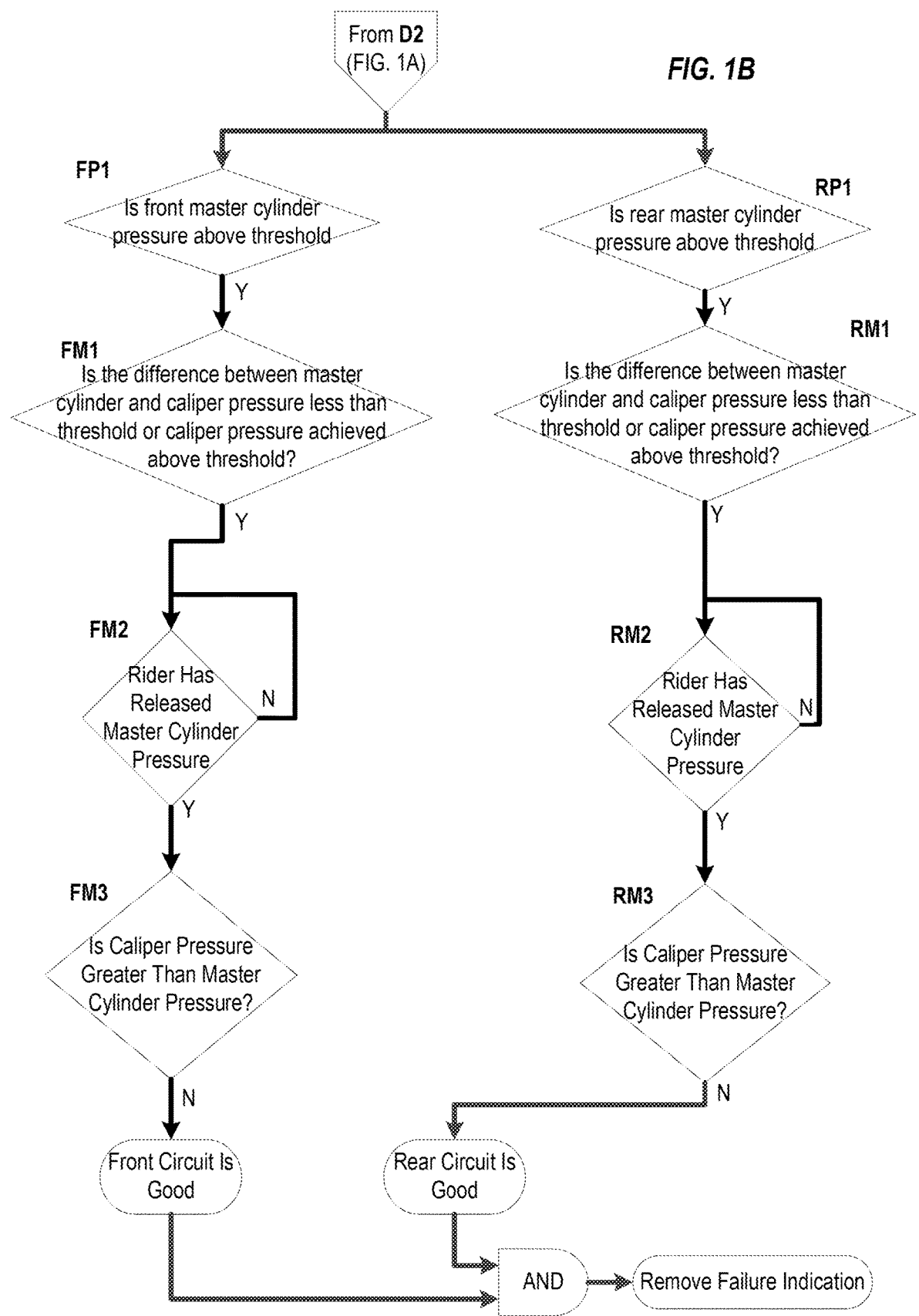
FIG. 1B is a second portion of the flowchart illustrating the method of diagnosing the functionality of a valve in the brake system.

As shown in FIG. 1A, at steps A and B, the ignition is switched on (step A) and any existing diagnostic routines of the electro-hydraulic control unit are performed (step B). If the vehicle passes the existing diagnostic routines (step C), the controller checks whether there is already a diagnostic fault (e.g., ABS codes) relating to the braking system 10 that has been identified and still active (step D1). If there is an active known fault, an ABS warning light visible to the operator is illuminated (e.g., remaining lit while the ignition is switched on, blinking briefly, or blinking while the ignition is switched on) (step D2). As shown in FIG. 1B, if the pressure within one of the master cylinders 26, 28 is above a threshold value, the respective circuit 12, 14 can be tested to determine whether the issue generating the diagnostic fault has been resolved.

Specifically, with respect to the front circuit 12, if the pressure within the master cylinder 26 is above the threshold value (step FP1), the controller checks if the pressure differential between the master cylinder 26 and the front wheel cylinder 16 is less than a threshold pressure differential (e.g., 20 bar delta) or if the pressure at the front wheel cylinder 16 is above the threshold pressure (step FM1). If the measured pressure differential/pressure satisfies one of the conditions described above, the controller waits for the operator to release the master cylinder pressure (step FM2). Upon releasing the master cylinder pressure, the controller compares the master cylinder pressure to the wheel cylinder pressure (step FM3). If the wheel cylinder pressure is not greater than the master cylinder pressure, then it is determined that an existing fault in the front circuit 12 (if the fault existed in the front circuit 12) is fixed. A similar test is applied to the rear circuit 14 with steps RP1, RM1, RM2, RM3 mirroring steps FP1, FM1, FM2, FM3, though applied to the rear circuit 14. If the diagnostic tests applied to the front and rear circuits 12, 14 produce positive results, the warning light is switched off, the logged ABS code is cleared, and the diagnostic method continues at step E shown in FIG. 1A. The diagnostic method further continues at step E if there are no logged diagnostic faults.

Figure 1C:
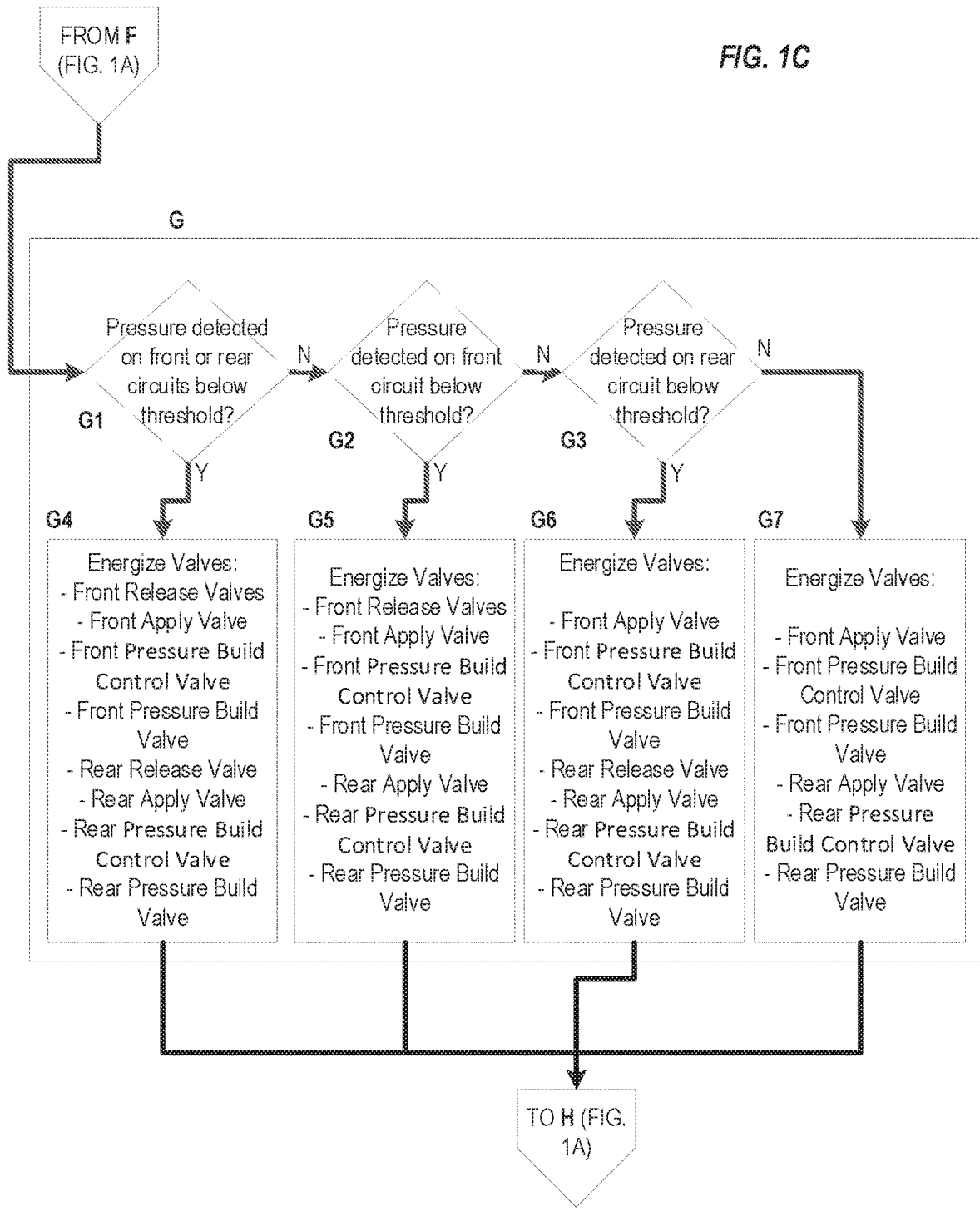
FIG. 1C is a third portion of the flowchart illustrating the method of diagnosing the functionality of a valve in the brake system.

At step E, the controller checks the rotational velocity of the engine (i.e., rotational velocity of the crankshaft of the engine), specifically checking if the engine velocity is zero revolutions per minute (or less than a threshold rotational velocity). If the rotational velocity is greater than zero (or a threshold value), then some or all of the valves 40, 42, 44, 46, 56, 58, 60, 62, 72 are cycled (step G) as shown in FIG. 1C. If the pressure in the circuits 12, 14 is below a threshold value (e.g., less than 3 bar) (step G1), all nine of the valves 40, 42, 44, 46, 56, 58, 60, 62, 72 described above are cycled (step G4). If only the pressure on the front circuit 12 is below the threshold value (step G2), the outlet valve 62 of the rear circuit 14 is not cycled to prevent pressure loss at the wheel cylinder 20, but the remaining valves 40, 42, 44, 46, 56, 58, 60, 72 are energized and cycled (step G5). If only the pressure on the rear circuit 14 is below the threshold value (step G3), the outlet valves 60, 72 of the front circuit 12 are not cycled to prevent pressure loss at the wheel cylinders 16, 18, but the remaining valves 40, 42, 44, 46, 56, 58, 62 are energized and cycled (step G6). If both the front and rear circuits 12, 14 are at or above the threshold pressure (step G3), the outlet valves 60, 62, 72 are not cycled, such that the remaining valves 40, 42, 44, 46, 56, 58 are still energized and cycled (step G7). Once all or some of the valves 40, 42, 44, 46, 56, 58, 60, 62, 72 are cycled based on the criteria outlined above, the controller checks if the engine has started (step H). Likewise, if the vehicle is moving above the speed threshold in step F, the cycling step (step G) is skipped and moves directly to step H.

Figure 1D:
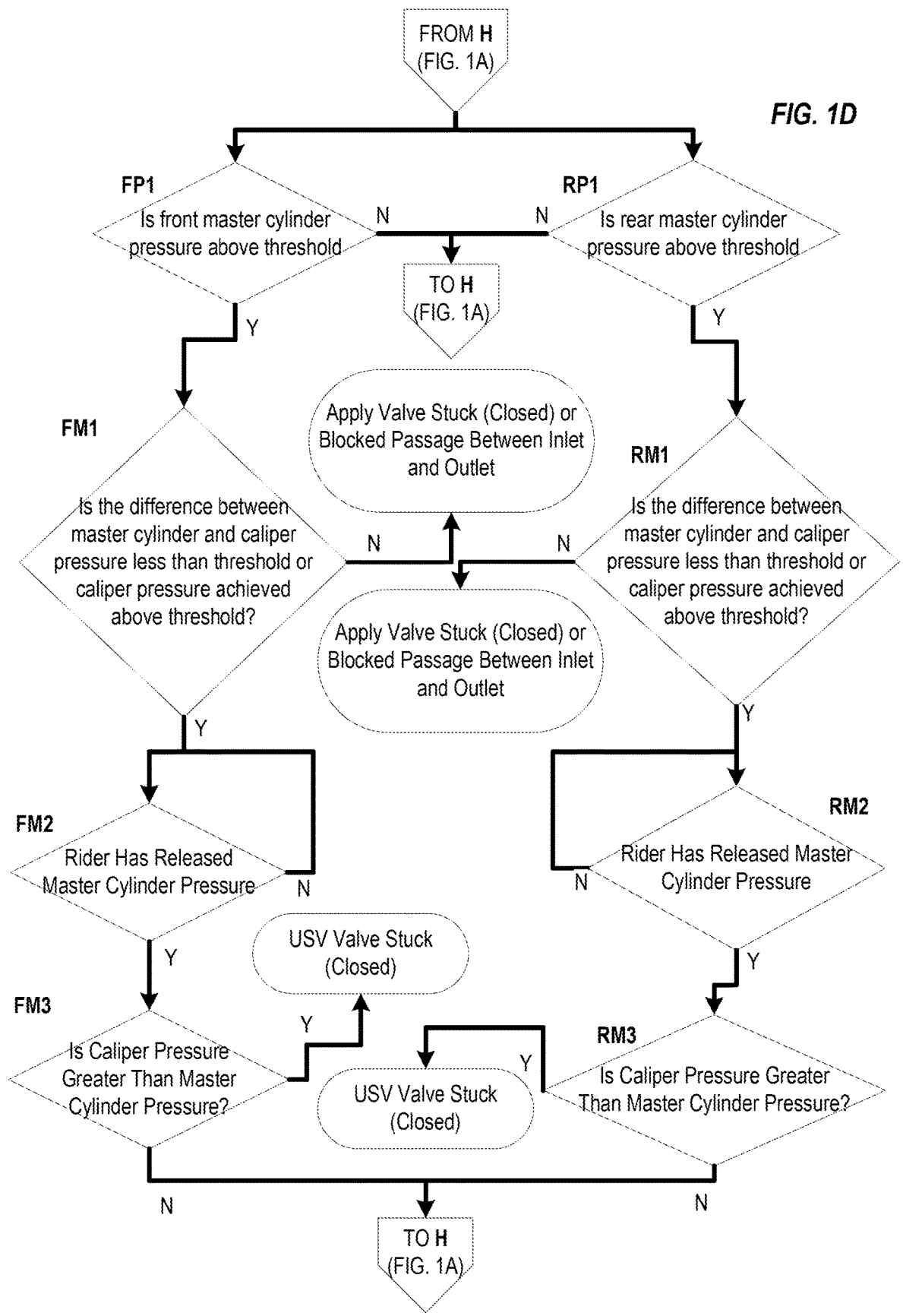
FIG. 1D is a fourth portion of the flowchart illustrating the method of diagnosing the functionality of a valve in the brake system.

In step H, the controller checks if the engine has started (e.g., is running at 700 or greater RPM for at least 50 milliseconds). If the engine has not started, the diagnostic method continues as shown in FIG. 1D. With reference to the front circuit 12, the controller checks if the pressure of the master cylinder 26 is above a threshold value (e.g., 20 bar) (step FP1). If it is not above the threshold value, the method returns to step H to check if the engine has started. If the master cylinder pressure is above the threshold value, the controller checks if the pressure differential between the master cylinder 26 and the front wheel cylinder 16 is less than a threshold pressure differential (e.g., 20 bar delta) or if the pressure at the front wheel cylinder 16 is above a threshold pressure (e.g., 20 bar) (step FM1). If the measured pressure differential does not satisfy one of the above conditions, it is determined that the inlet valve 56 is stuck closed or the passage between the inlet (i.e., directly downstream of the master cylinder 26) and the outlet (i.e., directly upstream of the wheel cylinder 16) is blocked. A failure indication is provided to the operator. If the measured pressure satisfies one of the conditions described above, the controller waits for the operator to release the master cylinder pressure (step FM2). Upon releasing the master cylinder pressure, the controller compares the master cylinder pressure to the wheel cylinder pressure (step FM3). If the wheel cylinder pressure is greater than the master cylinder pressure (or greater by a predetermined pressure differential, e.g., 20 bar delta), then it is determined that the switching valve 40 is stuck closed. A failure indication is provided to the operator. If the wheel cylinder pressure is not greater than the master cylinder pressure, the method returns to step H. A similar test is applied to the rear circuit 14 with steps RP1, RM1, RM2, RM3 mirroring steps FP1, FM1, FM2, FM3, though applied to the rear circuit 14. The procedure outlined in FIG. 1D may be repeated if the engine is not yet started. Alternatively, the procedure may wait at step H until the engine is started.

Figure 1E:
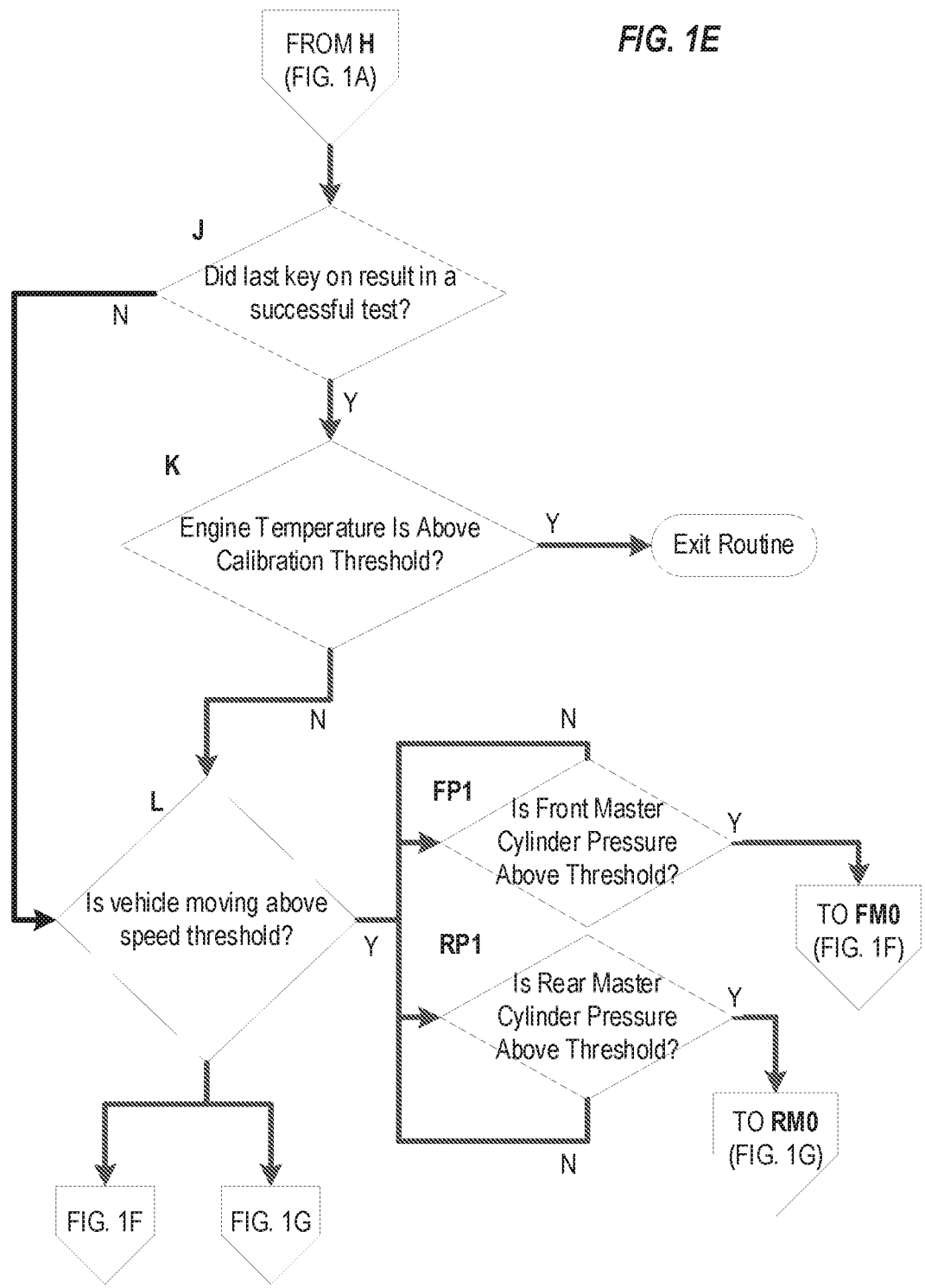
FIG. 1E is a fifth portion of the flowchart illustrating the method of diagnosing the functionality of a valve in the brake system.

If the engine is started (step H), the diagnostic method continues at step J on FIG. 1E. At step J, the controller checks if the previous ignition cycle or engine start-up resulted in a successful test (i.e., no stuck valves). If the most recent previous test was successful and the engine temperature is above a calibration threshold (step K), it is determined that the engine was successfully started recently with no stuck valves and therefore, the diagnostic test is exited. Further if a sensor reading (e.g., an engine head temperature or engine oil temperature sensor) or a timer indicates that the diagnostic test was successfully conducted recently (i.e., within a predetermined time duration; e.g., within the past four hours, eight hours, twelve hours, one day, etc.), the diagnostic test can be exited to limit the frequency of the test, to minimize unnecessary diagnostics, and to improve the longevity of the hardware. If the previous test was not successful (e.g., did not finish, determined the presence of a stuck valve, etc.) (step J) or the engine temperature is below the calibration threshold (e.g., has cooled since last use) (step K), the calibration method continues at step L.

At step L, the controller determines whether the vehicle is moving above a speed threshold (e.g., above 1.8 kilometers per hour). This measurement may be measured by a wheel speed sensor. If the vehicle is moving above the speed threshold, the controller checks if the first input device 22 (associated with the front circuit 12) is actuated, if the second input device 24 (associated with the rear circuit 14) is actuated, or if both of the first and second input devices 22, 24 is actuated. The controller determines if each input device 22, 24 is actuated by measuring the pressure at the respective master cylinder 26, 28. More specifically, the controller may measure if the pressure at the respective master cylinders 26, 28 is greater than a threshold value (e.g., 20 bar).

Figure 1F:
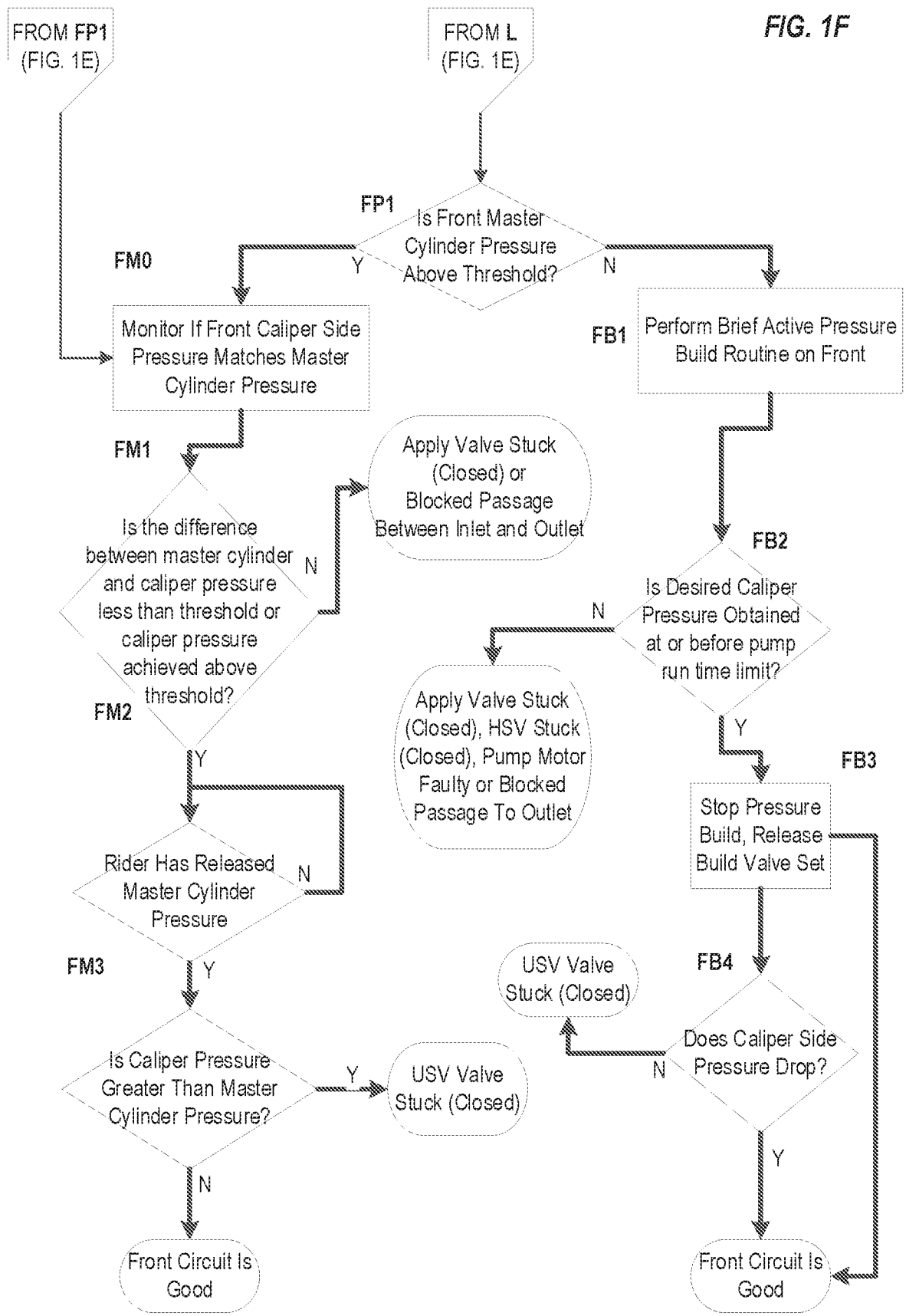
FIG. 1F is a sixth portion of the flowchart illustrating the method of diagnosing the functionality of a valve in the brake system.

If the controller notes that only the first (front) input device 22 is applied (step FP1), the diagnostic method continues at step FM0 (first diagnostic test of the front circuit 12) as shown in FIG. 1F. At step FM0, the controller monitors if the pressure at the front wheel cylinder 16 matches the pressure at the master cylinder 26. The controller compares the difference between the master cylinder pressure and the wheel cylinder pressure to a threshold pressure differential (e.g., 20 bar delta). The controller also compares the achieved wheel cylinder pressure to a threshold pressure (e.g., 20 bar) (step FM1). If the measured pressure differential or wheel cylinder pressure does not satisfy one of the above conditions, it is determined that the inlet valve 56 is stuck closed or the passage between the inlet and the outlet is blocked. A failure indication is provided to the operator. If the measured pressure satisfies one of the conditions described above, the controller waits for the operator to release the master cylinder pressure (step FM2). Upon releasing the master cylinder pressure, the controller compares the master cylinder pressure to the wheel cylinder pressure (step FM3). If the wheel cylinder pressure is greater than the master cylinder pressure (or greater by at least a predetermined amount; e.g., 20 bar), then it is determined that the switching valve 40 is stuck closed. A failure indication is provided to the operator. If the wheel cylinder pressure is not greater than the master cylinder pressure, then the controller has determined that the front circuit is functioning appropriately.

Figure 1G:
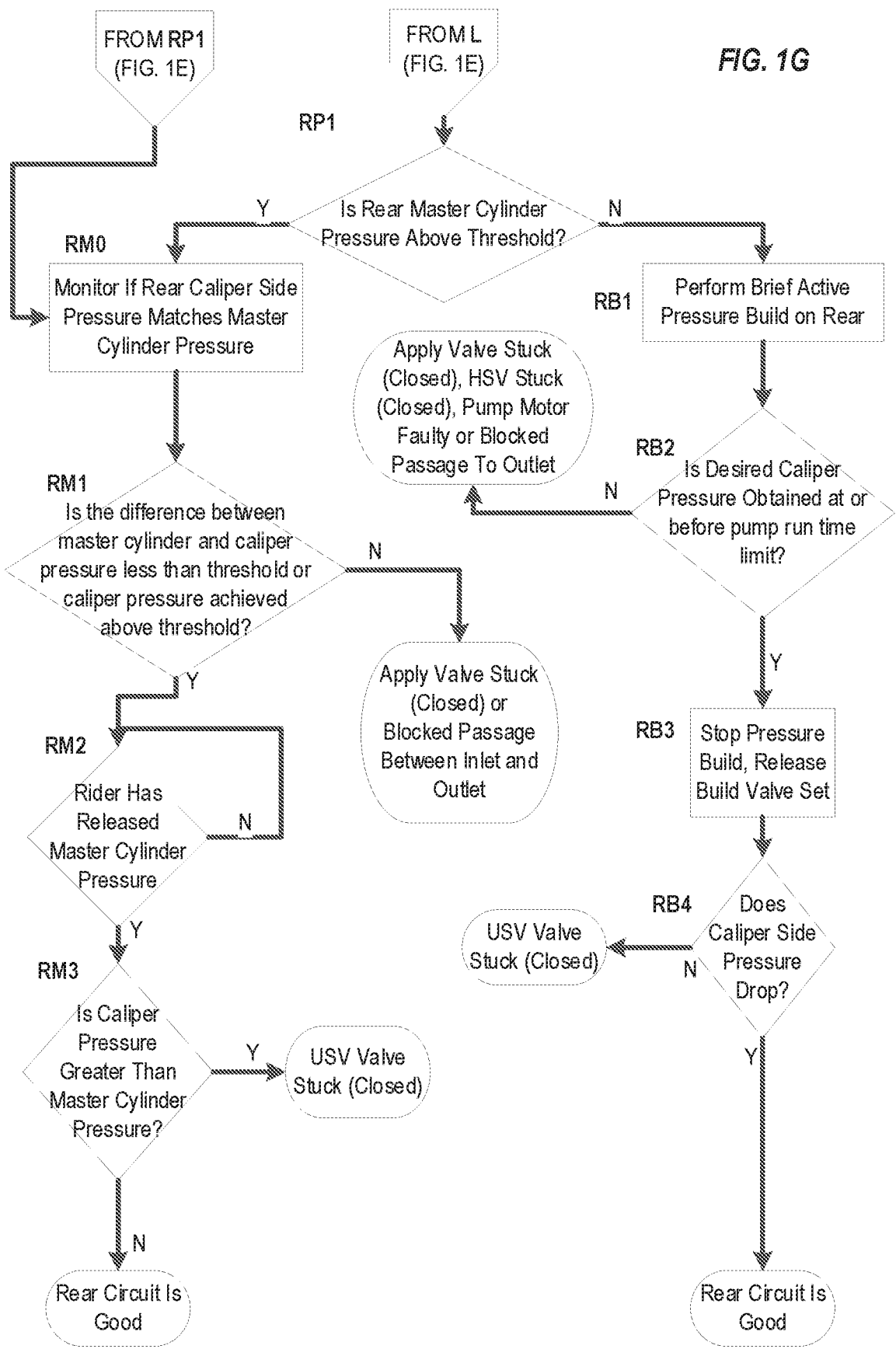
FIG. 1G is a seventh portion of the flowchart illustrating the method of diagnosing the functionality of a valve in the brake system.

If the controller notes that only the second (rear) input device 24 is applied (step RP1), the diagnostic method continues at step RM0 (first diagnostic test of the rear circuit 14) as shown in FIG. 1G. At step RM0, the controller monitors if the pressure at the rear wheel cylinder matches the pressure at the master cylinder 28. The controller compares the difference between the master cylinder pressure and the wheel cylinder pressure to a threshold pressure differential (e.g., 20 bar delta). The controller also compares the achieved wheel cylinder pressure to a threshold pressure (20 bar) (step RM1). If the measured pressure differential or wheel cylinder pressure does not satisfy one of the above conditions, it is determined that the inlet valve 58 is stuck closed or the passage between the inlet and the outlet is blocked. A failure indication is provided to the operator. If the measured pressure satisfies one of the conditions described above, the controller waits for the operator to release the master cylinder pressure (step RM2). Upon releasing the master cylinder pressure, the controller compares the master cylinder pressure to the wheel cylinder pressure (step RM3). If the wheel cylinder pressure is greater than the master cylinder pressure (or greater by at least a predetermined amount; e.g., 20 bar), then it is determined that the switching valve 42 is stuck closed. A failure indication is provided to the operator. If the wheel cylinder pressure is not greater than the master cylinder pressure, then the controller has determined that the rear circuit is functioning appropriately.

If the controller notes that both the front and rear input devices 22, 24 are applied, then both of the diagnostic tests (beginning at steps FM0 and RM0) are conducted.

If, at step L, the controller determines that the vehicle is not moving above the speed threshold, independent diagnostic tests are conducted at the front and rear circuits, as shown in FIGS. 1F and 1G. With reference to the front circuit 12 (and FIG. 1F), the controller determines if the pressure at the front master cylinder 26 is above a threshold value (e.g., 20 bar) (step FP1). If the pressure is above the threshold value, the method continues at step FM0 (first diagnostic test of the front circuit 12), as described above. If the pressure is not above the threshold value (e.g., if the rider has not actuated the first input device 22), the method continues at step FB1 (second diagnostic test of the front circuit 12). It should be noted that the terms "first diagnostic test" and "second diagnostic test" are used in the context of the specification to refer to the separate tests that can be conducted on the circuit 12, 14 and do not correspond to an order of testing. The terms "first" and "second" as used in the context of the diagnostic tests outline the order in which the diagnostic tests are introduced in the application.

At step FB1, the pump 30 associated with the front circuit 12 builds a limited amount of pressure (e.g., 5 bar) to the first front wheel cylinder 16 for a timed duration. If the pressure measured at the wheel cylinder 16 (as measured by the pressure sensor 64) does not increase to the desired pressure during activation of the pump 30 (within the pump run time limit) (step FB2), then the inlet valve 56 is stuck closed, the motor 34 driving the pump 30 is faulty, or the passage to the outlet is blocked. A failure indication is provided to the operator. If the desired pressure at the wheel cylinder 16 is attained via the pump 30 (step FB2), the pressure build is stopped and the pressure is released from the wheel cylinder 16 (step FB3). If the wheel cylinder pressure drops (step FB4), the circuit 12 associated with the rear wheel cylinder 16 is deemed good. If the wheel cylinder pressure does not drop, the switching valve 40 is stuck closed. Step FB4 can be skipped depending upon the test parameters.

With reference to the rear circuit 14 (and FIG. 1G), the controller determines if the pressure at the rear master cylinder 28 is above a threshold value (e.g., 20 bar) (step RP1). If the pressure is above the threshold value, the method continues at step RM0 (first diagnostic test of the rear circuit 14), as described above. If the pressure is not above the threshold value (e.g., if the rider has not actuated the second input device 24), the method continues at step RB1 (second diagnostic test of the rear circuit 14). At step RB1, the pump 32 associated with the rear circuit 14 builds a limited amount of pressure (e.g., 5 bar) to the rear wheel cylinder 20 for a timed duration. If the pressure measured at the wheel cylinder 20 (as measured by the pressure sensor 66) does not increase to the desired pressure during activation of the pump 32 (within the pump run time limit) (step RB2), then either the inlet valve 58 is stuck closed, the motor 34 driving the pump 32 is faulty, or the passage to the outlet is blocked. A failure indication is provided to the operator. If the desired pressure at the wheel cylinder 20 is attained via the pump 32 (step RB2), the pressure build is stopped and the pressure is released from the wheel cylinder 20 (step RB3). If the wheel cylinder pressure drops (step RB4), the circuit 14 associated with the rear wheel cylinder 20 is deemed good. If the wheel cylinder pressure does not drop, the switching valve 42 is stuck closed. Step RB4 can be skipped depending upon the test parameters.

If, during the tests starting at steps FB1, RB1, the controller notes that an input device 22, 24 is newly applied, the test may be aborted, and returned to steps FP1, RP1. Further, if vehicle motion is detected by a wheel speed sensor, the tests starting at steps FB1, RB1 may be likewise aborted.

Based on the information above, when the diagnostic method proceeds to step L, each circuit 12, 14 will be tested to ensure that braking provided by the input devices 22, 24 produces the desired braking pressure at the wheel cylinders 16, 18, 20. If the vehicle is moving above a speed threshold, the testing is limited to tests which do not actively impact the pressure at the wheel cylinders 16, 18, 20, yet still verify the functionality of the respective circuit 12, 14 when the respective input device 22, 24 is actuated. If the vehicle is not moving above the speed threshold, the testing is not limited by rider actuation of the input devices 22, 24, but verifies the functionality of the circuits 12, 14 whether the first input device 22, the second input device 24, both input devices 22, 24 or neither of the input devices 22, 24 is actuated.

Aside from giving the rider an indication of when the diagnostic system determines a fault, the controller may further cease or prevent engine operation if one or more of the diagnostic tests results in a failure signal. Further, the controller may prevent motive force from being applied to the vehicle, if the vehicle is not already moving. Further still, the controller may limit the motive force by enforcing a reduced torque authority or speed limiting the vehicle is a diagnostic test results in a failure signal.

The invention claimed is:

1. A method of conducting a diagnostic procedure for a braking system, the method comprising:
    analyzing via an electronic control unit whether only a first input device coupled to a first brake circuit is engaged or only a second input device coupled to a second brake circuit is engaged;
    conducting via the electronic control unit a diagnostic test testing a first valve and a second valve in the first brake circuit, in response to determining that only the first input device is engaged, the diagnostic test including
        during actuation of the first input device, measuring a master cylinder pressure via a first pressure sensor of the first brake circuit and measuring a wheel cylinder pressure via a second pressure sensor of the first brake circuit,
        comparing a difference between the master cylinder pressure and the wheel cylinder pressure to a threshold pressure value, and determining whether the first valve of the first brake circuit is stuck based on the comparison,
        upon a release of the first input device, taking second measurements of the master cylinder pressure and the wheel cylinder pressure via the respective first and second pressure sensors of the first brake circuit,
        comparing the second measurements of the master cylinder pressure and the wheel cylinder pressure and determining whether the second valve of the first brake circuit is stuck based on the comparison; and
    conducting via the electronic control unit a diagnostic test testing a first valve and a second valve in the second brake circuit, in response to determining that only the second input device is engaged, the diagnostic test including
        during actuation of the second input device, measuring a master cylinder pressure via a first pressure sensor of the second brake circuit and measuring a wheel cylinder pressure via a second pressure sensor of the second brake circuit,
        comparing a difference between the master cylinder pressure and the wheel cylinder pressure to a threshold pressure value, and determining whether the first valve of the second brake circuit is stuck based on the comparison, upon a release of the second input device, taking second measurements of the master cylinder pressure and the wheel cylinder pressure via the respective first and second pressure sensors of the second brake circuit, and
        comparing the second measurements of the master cylinder pressure and the wheel cylinder pressure and determining whether the second valve of the second brake circuit is stuck based on the comparison.

2. The method of claim 1, further comprising:
analyzing via the electronic control unit whether both of the first and second input devices are engaged; and
conducting, concurrently via the electronic control unit when both of the first and second input devices are engaged, both the diagnostic test testing the first and second valves in the first brake circuit and the diagnostic test testing the first and second valves in the second brake circuit.

3. The method of claim 2, further comprising:
analyzing via the electronic control unit whether neither of the first and second input devices is engaged; and
conducting via the electronic control unit a diagnostic test in at least one of the first and second brake circuits, wherein fluid pressure to at least one wheel cylinder is generated from within the at least one of the first and second brake circuits, in response to determining that neither of the first and second input devices is engaged.

4. The method of claim 1, wherein analyzing whether only the first input device is engaged or only the second input device is engaged includes measuring a first pressure at a first master cylinder, and comparing the measured first pressure to a master cylinder threshold pressure value, and measuring a second pressure at a second master cylinder and comparing the second measured pressure to the master cylinder threshold pressure value.

5. The method of claim 1, further comprising measuring an engine speed prior to analyzing whether only the first input device is engaged or only the second input device is engaged.

6. The method of claim 1, further comprising analyzing a timer with the electronic control unit, to determine a time since a last diagnostic test was conducted prior to analyzing whether only the first input device is engaged or only the second input device is engaged.

7. The method of claim 1, further comprising conducting via the electronic control unit a second diagnostic test in response to determining that only the first input device is engaged or in response to determining that both the first brake circuit and the second brake circuit are unactuated, including
during non-actuation of the second input device, generating a pump pressure directed to a wheel cylinder using a pump and measuring a wheel cylinder pressure via a second pressure sensor of the second brake circuit,
comparing the wheel cylinder pressure to the pump pressure and determining whether the first valve of the second brake circuit is stuck based on the comparison,
upon release of the pump pressure, taking second measurements of the wheel cylinder pressure via the second pressure sensor of the second brake circuit, and
checking the second measurement of the wheel cylinder pressure and determining whether the second valve of the second brake circuit is stuck based on the second measurement of the wheel cylinder pressure.

8. The braking system of claim 7, wherein the second diagnostic test is performed in response to the electronic control unit determining that both the first brake circuit and the second brake circuit are unactuated.

9. A braking system comprising;
a first brake circuit including,
a first master cylinder;
a first wheel cylinder positioned at a terminal end of the first brake circuit;
a first pressure sensor configured to measure a first master cylinder pressure;
a second pressure sensor configured to measure a first wheel cylinder pressure;
a second brake circuit including,
a second master cylinder;
a second wheel cylinder positioned at a terminal end of the second brake circuit;
a first pressure sensor configured to measure a second master cylinder pressure;
a second pressure sensor configured to measure a second wheel cylinder pressure;
a first input device operable to actuate the first master cylinder;
a second input device operable to actuate the second master cylinder; and
an electronic control unit operable in a first mode in response to determining that only the first input device is actuated and a second mode in response to determining that only the second input device is actuated,
wherein, in the first mode, the electronic control unit is programmed to conduct a first diagnostic test of the first brake circuit by comparing values of the first master cylinder pressure and the first wheel cylinder pressure, from the first and second pressure sensors, measured during actuation of the first input device, such that the controller is programmed to diagnose whether a first valve of the first brake circuit is stuck based on the comparison, and by further comparing values of the first master cylinder pressure and the first wheel cylinder pressure, from the first and second pressure sensors, measured upon release of the first input device, such that the controller is programmed to diagnose whether a second valve of the first brake circuit is stuck based on the comparison,
and wherein, in the second mode, the electronic control unit is programmed to conduct a first diagnostic test of the second brake circuit by comparing values of the second master cylinder pressure and the second wheel cylinder pressure, from the first and second pressure sensors, measured during actuation of the second input device, such that the controller is programmed to diagnose whether a first valve of the second brake circuit is stuck based on the comparison, and by further comparing values of the second master cylinder pressure and the second wheel cylinder pressure, from the first and second pressure sensors, measured upon release of the second input device, such that the controller is programmed to diagnose whether a second valve of the second brake circuit is stuck based on the comparison,
wherein the second mode includes a second diagnostic test of the first brake circuit.

10. The braking system of claim 9, wherein the electronic control unit is operable in a third mode when the first input device is actuated and the second input device is actuated, wherein the third mode includes the first diagnostic test of the first brake circuit and the first diagnostic test of the second brake circuit.

11. The braking system of claim 10, wherein the electronic control unit is operable in a fourth mode when neither the first input device nor the second input device is actuated, wherein the fourth mode includes the second diagnostic test of the first brake circuit and a second diagnostic test of the second brake circuit.

12. The braking system of claim 11, further comprising a first pump in the first brake circuit and a second pump in the second brake circuit, wherein the electronic control unit is programmed to conduct the second diagnostic test of the first brake circuit in the second mode and the fourth mode by generating a first pump pressure directed to the first wheel cylinder using the first pump and measuring the first wheel cylinder pressure via the second pressure sensor of the first brake circuit, comparing the first wheel cylinder pressure to the first pump pressure, such that the controller is programmed to determine whether the first valve of the first brake circuit is stuck based on the comparison, upon release of the first pump pressure, taking a second measurement of the first wheel cylinder pressure via the second pressure sensor of the first brake circuit, and checking the second measurement of the first wheel cylinder pressure, such that the controller is programmed to determine whether the second valve of the first brake circuit is stuck based on the second measurement of the first wheel cylinder pressure, and wherein the electronic control unit is programmed to conduct the second diagnostic test of the second brake circuit in the first mode and the fourth mode by generating a second pump pressure directed to the second wheel cylinder using the second pump and measuring the second wheel cylinder pressure via the second pressure sensor of the second brake circuit, comparing the second wheel cylinder pressure to the second pump pressure, such that the controller is programmed to determine whether the first valve of the second brake circuit is stuck based on the comparison, upon release of the second pump pressure, taking a second measurement of the second wheel cylinder pressure via the second pressure sensor of the second brake circuit, and checking the second measurement of the second wheel cylinder pressure, such that the controller is programmed to determine whether the second valve of the second brake circuit is stuck based on the second measurement of the second wheel cylinder pressure.

13. The braking system of claim 11, wherein each of the second diagnostic tests is programmed to the electronic control unit to provide instructions for generating a pump pressure in a corresponding one of the first and second wheel cylinders using a pump in the corresponding one of the first and second brake circuits, measuring a wheel cylinder pressure via the corresponding second pressure sensor, comparing the measured wheel cylinder pressure to the pump pressure, such that the controller is programmed to diagnose whether the first valve of the corresponding one of the first and second brake circuits is stuck based on the comparison, releasing the pump pressure, and checking the wheel cylinder pressure with the second pressure sensor, such that the controller is programmed to diagnose whether the second valve of the corresponding one of the first and second brake circuits is stuck based on the wheel cylinder pressure.

14. The braking system of claim 9, further comprising a first pump, wherein, in the second mode, the electronic control unit is programmed to conduct the second diagnostic test of the first brake circuit, the second diagnostic test of the first brake circuit includes generating a first pump pressure directed to the first wheel cylinder using the first pump and measuring the first wheel cylinder pressure via the second pressure sensor of the first brake circuit, comparing the first wheel cylinder pressure to the first pump pressure such that the controller is programmed to determine whether the first valve of the first brake circuit is stuck based on the comparison, upon release of the first pump pressure, taking a second measurement of the first wheel cylinder pressure via the second pressure sensor of the first brake circuit, and checking the second measurement of the first wheel cylinder pressure such that the controller is programmed to determine whether the second valve of the first brake circuit is stuck based on the second measurement of the first wheel cylinder pressure.

15. A method of conducting a diagnostic procedure for a braking system, the method comprising:
operating an electronic control unit into a first mode in response to identifying via the electronic control unit that a first input device coupled to a first brake circuit is engaged and that a second input device coupled to a second brake circuit is not engaged;
in the first mode, the electronic control unit conducting a first diagnostic test testing a first valve and a second valve in the first brake circuit, the first diagnostic test including
during actuation of the first input device, measuring a master cylinder pressure via a first pressure sensor of the first brake circuit and measuring a wheel cylinder pressure via a second pressure sensor of the first brake circuit,
comparing a difference between the master cylinder pressure and the wheel cylinder pressure to a threshold pressure value, and determining whether the first valve of the first brake circuit is stuck based on the comparison,
upon a release of the first input device, taking second measurements of the master cylinder pressure and the wheel cylinder pressure via the respective first and second pressure sensors of the first brake circuit, and
comparing a difference between the second measurements of the master cylinder pressure and the wheel cylinder pressure to the threshold pressure value, and determining whether the second valve of the first brake circuit is stuck based on the comparison; and
in the first mode, the electronic control unit conducting a second diagnostic test testing a first valve and a second valve in the second brake circuit, the second diagnostic test including
during non-actuation of the second input device, generating a pump pressure directed to a wheel cylinder using a pump and measuring a wheel cylinder pressure via a second pressure sensor of the second brake circuit,
comparing the wheel cylinder pressure to the pump pressure, and determining whether the first valve of the second brake circuit is stuck based on the comparison,
upon release of the pump pressure, taking a second measurement of the wheel cylinder pressure via the second pressure sensor of the second brake circuit, and
checking the second measurement of the wheel cylinder pressure, and determining whether the second valve of the second brake circuit is stuck based on the comparison.

16. The method of claim 15, further comprising verifying with the electronic control unit that a vehicle speed is below a threshold value prior to conducting the second diagnostic test.

* * * * *